H. D. WATERHOUSE.
POWER TIRE PUMP.
APPLICATION FILED JUNE 27, 1910.
977,351.
Patented Nov. 29, 1910.
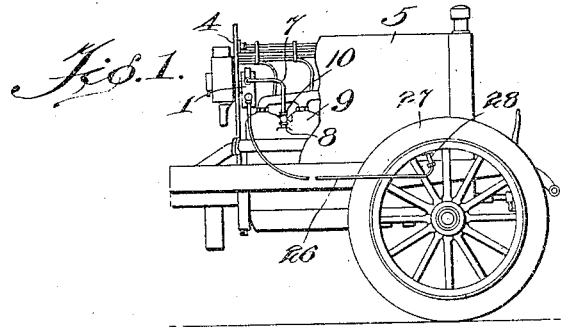
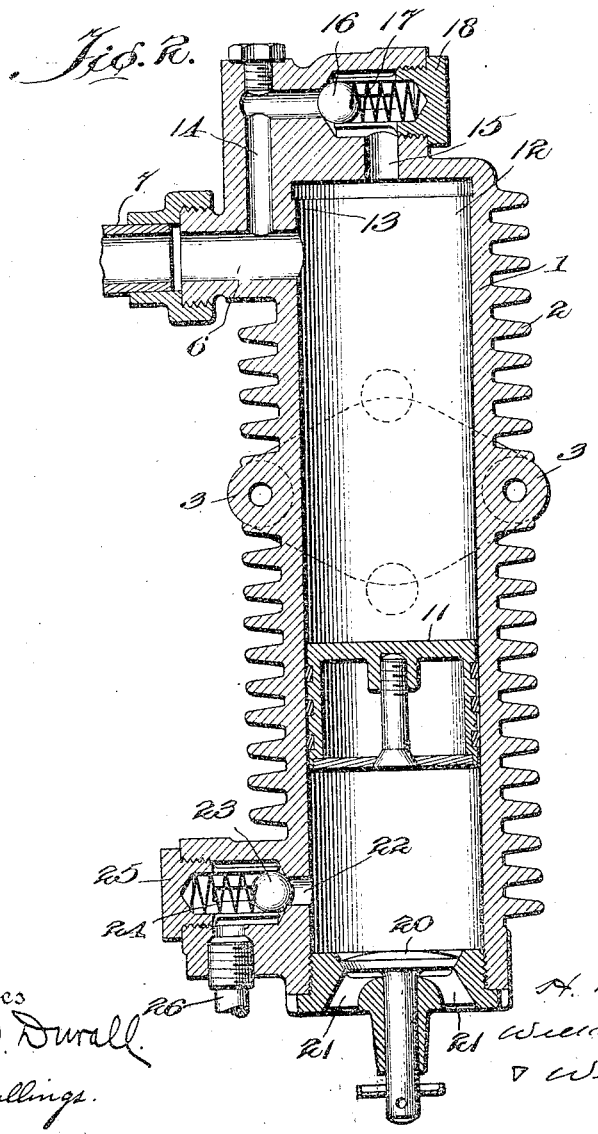

UNITED STATES PATENT OFFICE.

HAROLD D. WATERHOUSE, OF WOLLASTON, MASSACHUSETTS.

POWER TIRE-PUMP.

977,351.   Specification of Letters Patent.   Patented Nov. 29, 1910.

Application filed June 27, 1910.  Serial No. 569,220.   REISSUED

*To all whom it may concern:*

Be it known that I, HAROLD D. WATERHOUSE, a citizen of the United States, residing at Wollaston, in the county of Norfolk and State of Massachusetts, have invented certain new and useful Improvements in Power Tire-Pumps; and I do hereby declare the following to be a full, clear, and exact description of the invention, such as will enable others skilled in the art to which it appertains to make and use the same.

This invention relates to power tire pumps and has for its object the production of a pump which will utilize the gases from an automobile motor to pump up the tires of the machine, and will at the same time prevent said gases from entering the tire. In other words, this invention provides a means for readily, cheaply and quickly inflating tires with fresh air at all times, and at the same time will prevent grease and other deleterious substances found in motor cylinder gases from entering the tire.

To these ends, the invention consists in the novel details of construction and combinations of parts more fully hereinafter disclosed and particularly pointed out in the claims.

Referring to the accompanying drawings forming a part of this specification and in which like numerals refer to like parts in all the views, Figure 1 is a diagrammatic view, partly broken away, showing the application of my pump to the wheel of an automobile; and, Fig. 2, is an enlarged sectional view of the pump detached from the motor cylinder.

1 indicates any suitable cylinder, preferably provided with the radiating ridges or projections 2, and with lugs or other means 3, for securing the cylinder to the dashboard 4, or other portion of the automobile 5. This cylinder is provided with a port 6, adapted to be connected as by the pipe 7 to the cylinder 8, of the engine 9, and this pipe 7 is preferably provided with a valve 10, as indicated.

The cylinder 1, carries a piston 11, which, as shown, is devoid of piston rods, and, therefore, I term the same a floating piston, and the bore 12 of the cylinder extends somewhat beyond the port 6 as indicated at 13, in order that the piston may have a cushioned stroke. By extending the bore 12, however, the piston is liable to be sucked up beyond the port 6, and to close the same. In order to obviate these disadvantages, I provide the by-pass 14 which enters the port 6, outside of the cylinder, as shown, and which enters the cylinder at its extreme end, as indicated at 15. The by-pass 14 is provided with a valve 16 preferably of the ball type which may be conveniently controlled as by the spring 17. A convenient way of supporting the valve is by the cage 18. The other end of the cylinder 1 is provided with the valve 20, preferably of the form of a check valve, which controls the port 21 which admits fresh air into the cylinder on the side of the piston opposite to that on which the engine gases exhaust. A port 22 is also located at a distance from the air inlet end of the cylinder, in order to provide a cushion for the piston, and this port is preferably provided with a valve 23 of the ball type which may be conveniently controlled by a spring 24, also carried by a cage 25 similar to the cage 18. Connected with the port 22 is the pipe 26, adapted to convey the air to the tire 27, and to be connected and disconnected therefrom as by the usual means 28.

The operation of my invention is as follows:—When it is desired to inflate the tire, the pipe 26 is connected by the means 28 to the tire 27, and the valve 10 is opened. The engine being started, the combustion gases from the same enter the port 6 and force the floating piston 11 toward the valve 20. This, in turn, causes any air which may be in the cylinder on the opposite side of the piston to be forced out of the port 22, and through the pipe 26 into the tire. Upon the occurrence of the intake stroke of the engine, a vacuum of course is formed in the cylinder 1, and the pressure of the atmosphere will cause the valve 20 to unseat, while the piston 11 will be thrown to that end of the cylinder at which the port 6 is located. Upon the next compression and expansion strokes of the engine taking place, the said piston 11 will be again forced to the opposite end of the cylinder, thereby causing the valve 20 to seat, the valve 23 to unseat, and an additional supply of air to be forced into the tire.

Should the suction to which the floating piston 11 is subjected cause the same to pass beyond the port 6 and thereby close the latter, then upon the next compressive stroke, the gases entering the by-pass 14, will cause the valve 16 to unseat, and said gases entering the outlet 15, will force the piston 11 past the port 6, thereby uncovering the same, and the other portions of the compressed gases will complete the stroke as above.

It will thus be seen that by the simple expedient of employing a floating piston in connection with the construction above disclosed, I am enabled at all times to prevent any grease or other deleterious substances entering the tire, and yet at the same time I am enabled readily to efficiently and inexpensively pump up the tire from the motor, at will. In other words, I prevent the gases and air from mixing, while at the same time, I utilize the air compressed by said gases to inflate the tire.

It is obvious that those skilled in the art may vary the details of construction and arrangement of parts without departing from the spirit of my invention, and therefore, I do not wish to be limited to said features except as may be required by the claims.

It is also obvious that the use of my invention is not confined to tires, for it may be used on motor boats and wherever it is desired to provide a supply of fresh air under pressure.

What I claim is:—

1. In a power tire pump, the combination of a pump cylinder, a floating piston therein, a port at one end of said cylinder adapted to be connected to the chamber of a motor cylinder, a valved by-pass communicating with said port and said cylinder, a port at the other end of said pump cylinder adapted to be connected to the tire to be inflated, and a valved port adapted to admit air into said pump cylinder, substantially as described.

2. In a power tire pump, the combination of a cylinder, a port at one end adapted to communicate with the chamber of an engine cylinder and to admit the gases into said pump cylinder, a port at the other end of said pump cylinder adapted to be connected with a tire to be inflated, a by-pass leading from said first mentioned port to said cylinder, a valve adapted to admit air into said cylinder, a valve adapted to admit air into said pump cylinder, and a floating piston in said pump cylinder adapted to prevent said air and gases from mixing, substantially as described.

3. In a power tire pump, the combination of a cylinder, a port at one end of said cylinder adapted to admit the combustion gases from an engine into said cylinder, a piston adapted to be subjected to the pressure of said gases on one face during the compressive stroke of the engine, and to close said port during the suction stroke thereof, a by-pass connected to said port and adapted to deliver said gases to said piston, a valve adapted to admit air to the other face of said piston and a valved port adapted to connect with the tire to be inflated, substantially as described.

4. In a power tire pump, the combination of a cylinder means to secure the same to an automobile, means to radiate the heat generated in said cylinder, a floating piston in said cylinder, a port to admit the combustion gases of an engine to one side of said piston and adapted to be closed by said piston; a valved by-pass connected to said port, and entering said cylinder; connections between said cylinder and said engine, and valved connections on the other side of said piston between said cylinder and the tire to be inflated, substantially as described.

5. In a power tire pump, the combination of a cylinder, a floating piston in said cylinder, a port located away from the extreme end of said cylinder and adapted to admit gases from the combustion chamber of an engine into said cylinder on one side of said piston, a valved by-pass connecting said port and the extreme end of said cylinder adapted to deliver combustion gases on the same side of said piston as said port, a check valve in the extreme other end of said cylinder adapted to deliver air on the other side of said piston, and a valved port on said last mentioned side of said piston adapted to deliver said air to the tire to be inflated, substantially as described.

6. In a power tire pump, the combination of a cylinder; a floating piston therein; an inlet port entering the side of said cylinder to form a cushioning space for said piston between said port and the extreme end of said cylinder; a valved by-pass between said port and said cylinder end; a valved port for air at the extreme other end of said cylinder; and an exit port for air entering the side of said cylinder leaving a cushioning space for said piston between said air inlet port and said air exit port, substantially as described.

In testimony whereof, I affix my signature, in presence of two witnesses.

HAROLD D. WATERHOUSE.

Witnesses:
E. M. FULLER,
WILLIAM W. HILL.